United States Patent
Sun et al.

(10) Patent No.: US 7,027,253 B1
(45) Date of Patent: Apr. 11, 2006

(54) MICROACTUATOR SERVO CONTROL DURING SELF WRITING OF SERVO DATA

(75) Inventors: Yu Sun, Fremont, CA (US); Yunfeng Li, San Jose, CA (US); Lin Guo, Saratoga, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 11/050,118

(22) Filed: Feb. 3, 2005

Related U.S. Application Data (60) Provisional application No. 60/599,662, filed on Aug. 6, 2004.

(51) Int. Cl.
 *G11B 21/02* (2006.01)
 *G11B 5/596* (2006.01)

(52) U.S. Cl. ...................................... 360/75; 360/77.08
(58) Field of Classification Search ..................... None
 See application file for complete search history.

(56) References Cited

U.S. PATENT DOCUMENTS

| | | | |
|---|---|---|---|
| 5,089,757 A | 2/1992 | Wilson | |
| 5,189,578 A | 2/1993 | Mori et al. | |
| 5,301,072 A | 4/1994 | Wilson | |
| 5,553,086 A | 9/1996 | Sompel et al. | |
| 5,668,679 A | 9/1997 | Swearingen et al. | |
| 6,266,205 B1 | 7/2001 | Schreck et al. | |
| 6,292,317 B1 | 9/2001 | Alexander | |
| 6,304,407 B1 | 10/2001 | Baker et al. | |
| 6,411,459 B1 | 6/2002 | Belser et al. | |
| 6,437,937 B1 | 8/2002 | Guo et al. | |
| 6,445,545 B1 | 9/2002 | Guo et al. | |
| 6,493,176 B1 | 12/2002 | Deng et al. | |
| 6,504,670 B1 | 1/2003 | Dittmar | |
| 6,519,107 B1 | 2/2003 | Ehrlich et al. | |
| 6,600,620 B1 | 7/2003 | Krounbi et al. | |
| 6,631,046 B1 | 10/2003 | Szita et al. | |
| 6,704,156 B1 | 3/2004 | Baker et al. | |
| 6,707,632 B1 | 3/2004 | Raphael et al. | |
| 6,721,124 B1 | 4/2004 | Chang et al. | |
| 6,738,205 B1 | 5/2004 | Moran et al. | |
| 6,751,046 B1 | 6/2004 | Szita et al. | |
| 6,760,185 B1 | 7/2004 | Roth et al. | |
| 6,771,443 B1 | 8/2004 | Szita et al. | |
| 6,785,075 B1 | 8/2004 | Bryant et al. | |
| 6,798,610 B1 | 9/2004 | Deng et al. | |
| 6,819,518 B1 | 11/2004 | Melkote et al. | |
| 2004/0160696 A1* | 8/2004 | Meyer | 360/77.05 |
| 2004/0264031 A1* | 12/2004 | Yatsu | 360/75 |

* cited by examiner

*Primary Examiner*—David Hudspeth
*Assistant Examiner*—Mitchell Slavitt
(74) *Attorney, Agent, or Firm*—Foley & Lardner LLP (57) ABSTRACT

Compensation for disk mode disturbances during self-writing of servo data is provided in a manner that accounts for differences in orientation between the disk surface from which position information is derived and the disk surface on which servo data is written. Microactuators corresponding to upper surfaces of disks may have a wiring polarity that is out of phase with the wiring polarity of microactuators corresponding to upper surfaces of disks so that disk mode compensation signals supplied to the microactuators produce motion in opposite directions. The servo control system may supply signals to microactuators individually and select the polarities of those signals to account for differences in orientation between the disk surface from which position information is derived and the disk surface on which servo data is written.

20 Claims, 5 Drawing Sheets

MICROACTUATOR SERVO CONTROL DURING SELF WRITING OF SERVO DATA

RELATED APPLICATIONS

Priority is claimed from U.S. Provisional Application Ser. No. 60/599,662, filed on 6 Aug. 2004, the entirety of which is incorporated herein by reference.

BACKGROUND

1. Field of the Invention

The present invention relates to a control system in a hard disk drive. In particular, the present invention relates to controlling the positions of transducer heads during self-writing of servo data.

2. Related Technology

Figure 1:
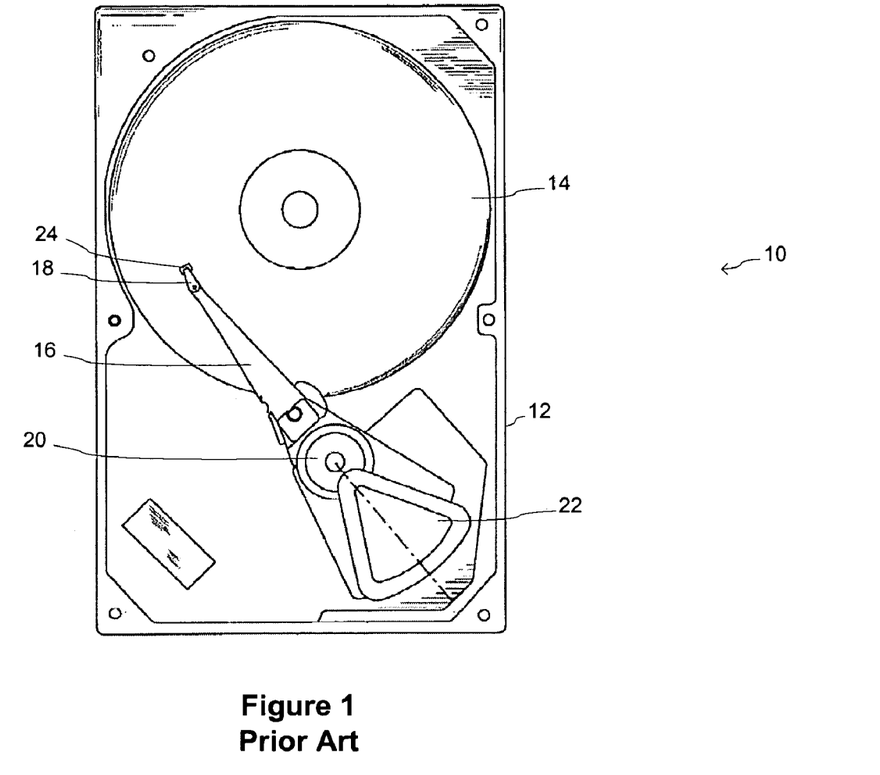
FIG. 1 shows a first view of a conventional hard disk drive structure.
Figure 2:
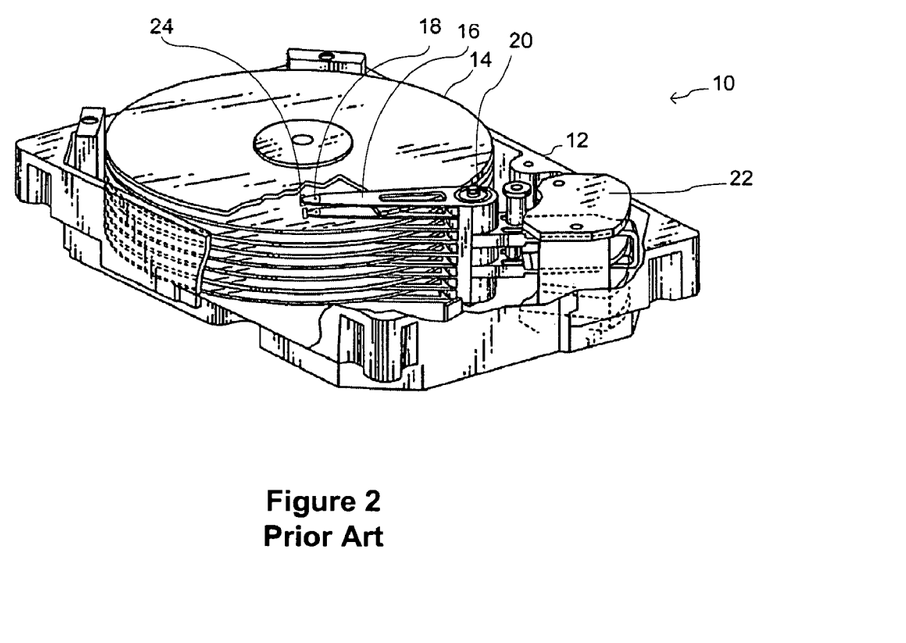
FIG. 2 shows a second view of a conventional hard disk drive structure.

FIGS. 1 and 2 show typical components of a hard disk drive. The disk drive, generally identified by reference number 10, includes a base 12 and magnetic disks 14. The magnetic disks 14 are rotated relative to the base by a spindle motor (not shown) that is mounted to the base 12. An actuator arm assembly supports a transducer head 24 near the surface of each disk. Each transducer head 24 includes a read element for reading data and signals from the disk surface and a write element for writing data and signals to the disk surface.

Each actuator arm assembly includes a first stage 16 and a second stage 18. The first stages 16 are mounted to an axle 20 and are driven by a primary actuator 22 such as a voice coil motor or linear motor to radially position the actuator arm assemblies with respect to the disk surfaces. The first stages are fixed with respect to one another and move together. The second stages 18 are joined to corresponding first stages 16 in a manner that allows the second stages 18 to move with respect to the first stages 16 through planes parallel to the surfaces of their corresponding disks, such as by pivoting or sliding with respect to the first stages 16. The articulation of the second stages 18 with respect to the first stages 16 may be provided by a journal bearing, a flexible interconnection, or any other joining structure that allows the second stages 18 to move with respect to the first stages 16. Each second stage is moved by a microactuator (not shown). Various types of microactuators may be employed, including a piezoelectric actuator, an electromagnetic actuator, and an electrostatic actuator. Examples of microactuators are provided in U.S. Pat. No. 5,189,578 and U.S. Pat. No. 5,867,347.

The primary actuators 22 and microactuators position the transducer heads 24 with respect to tracks on the disk surfaces. The operation of the primary actuator 22 and microactuators is controlled by a servo system based on servo data read from the disk surface. The servo data typically includes track number data fields that are used for coarse positioning during track seeking and settling operations and sector number data fields that provide circumferential location information within the track. The servo data further includes servo bursts that are embedded within the user data tracks. The servo bursts generate an analog signal that is representative of the lateral position of the transducer head read element relative to the center line of the track. The signals generated by the servo bursts are used by the servo controller to generate control signals that are applied to the primary actuator and microactuators to optimize the track following operation. Examples of servo burst patterns and their use in controlling the position of a transducer head are provided in U.S. Pat. No. 5,301,072, U.S. Pat. No. 5,771,131, U.S. Pat. No. 6,266,205, U.S. Pat. No. 6,369,974, U.S. Pat. No. 6,452,990, U.S. Pat. No. 6,614,608, U.S. Pat. No. 6,643,082, and U.S. Pat. No. 6,721,124. The track seeking operation typically employs only the coarse actuator 22 but in some instances may also employ the microactuators. The microactuators are typically used for settling the transducer head 24 position immediately following the seek operation, and for controlling the position of the transducer head 24 during the track following operation.

Figure 3:
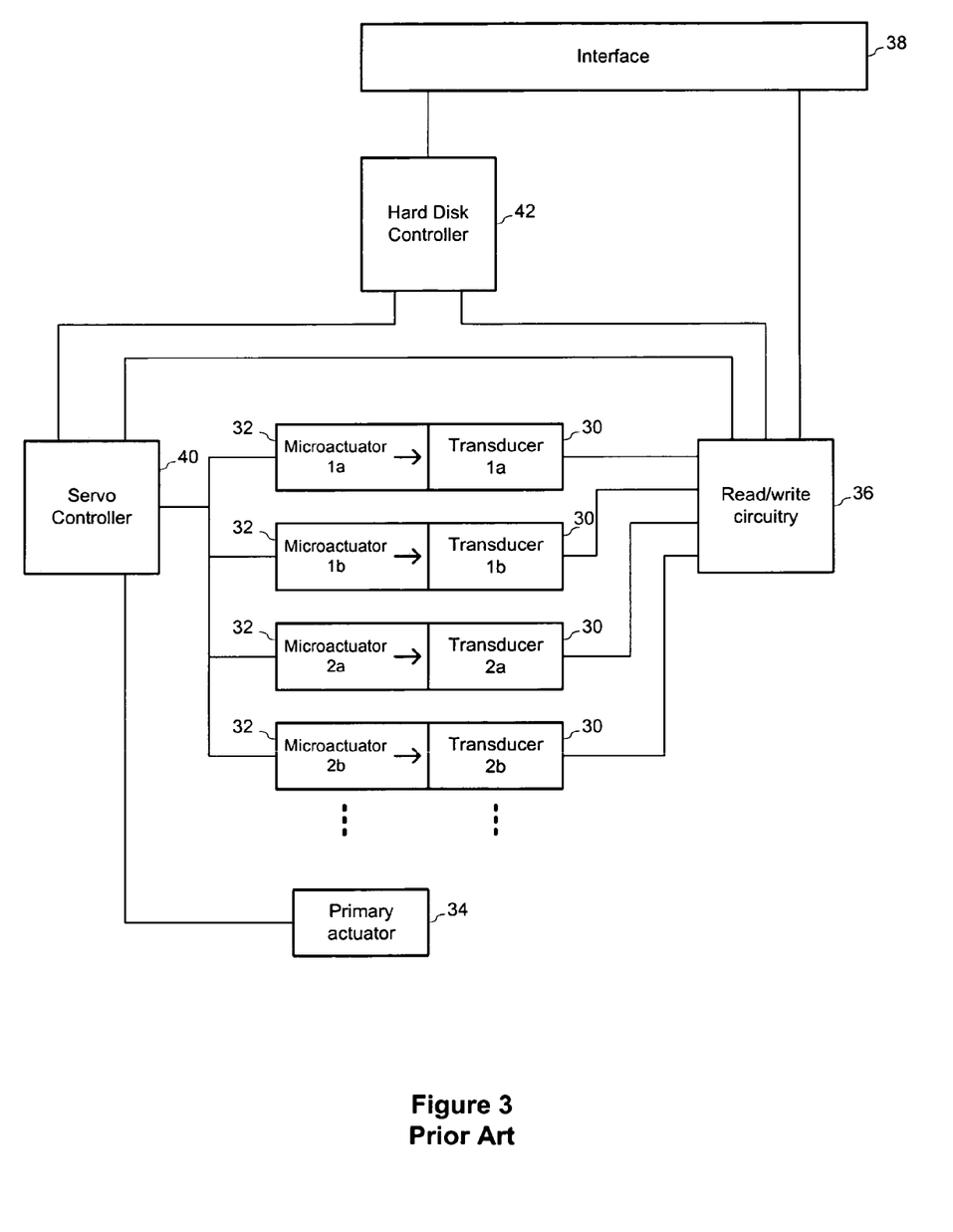
FIG. 3 shows control circuitry and related elements in a conventional hard disk drive.

FIG. 3 shows a diagram of control circuitry and related elements within a typical hard disk drive. As described above, a primary actuator 34 such as a voice coil motor controls the position of the actuator arm assembly. As further described above, the hard disk drive includes transducer heads 30 that are also moveable by microactuators 32. In the illustration of FIG. 3, the transducers 30 and microactuators 32 are labeled such that elements with the same numbers (e.g. transducers 1a and 1b) correspond to the same disk, while elements with the same letters (e.g. transducers 1a and 2a) correspond to disk surfaces having the same orientation, i.e. upper surfaces or lower surfaces.

The hard disk drive also includes read/write circuitry 36 that processes data and signals that are read from or written to the disks by the transducers 30. User data read from or to be written to the disks may be communicated with a host device through an interface 38. Servo data and signals read from the disks may be supplied to a servo controller 40. The servo controller 40 includes circuitry for performing signal processing such as discrete Fourier transformation and spectral analysis on a position error signal generated from servo burst signals obtained from the transducer heads to generate primary actuator and microactuator control signals to control the positions of the transducers 30. A variety of implementations for providing primary actuator and microactuator control may be utilized, including a parallel loop implementation, a master-slave loop implementation, a dual feedback loop implementation, and a master-slave with decoupling implementation. The servo controller supplies the same control signal to all of the microactuators 32. The arrows associated with the microactuators 32 in FIG. 3 indicate that all of the microactuators have the same wiring polarity. For purposes of this document, microactuators are considered to have the same wiring polarity if they move in the same direction in response to a signal supplied by the servo controller 40.

A disk drive controller 42 coordinates the operation of the elements of the hard disk drive including the interface 32, the servo controller 34, and the read/write circuit 36. The disk drive controller 42 also identifies the tracks that the transducers 30 are to seek or follow and supplies that information to the servo controller 40.

Servo data is written to the disk surfaces during manufacturing. The servo data may be written prior to assembly of the hard disk drive by a servo track writer in a clean room environment using laser interferometry to precisely position the transducer heads as the servo data is written. However this process is time consuming and cost intensive, and so several alternatives have been developed. In one alternative, a master pattern is written to one surface of a reference disk using a servo track writer, and a hard disk drive is then assembled using that disk and one or more additional blank disks. The master pattern may be servo data or a different pattern from which position information may be derived to enable the writing of servo data. After assembly, the master pattern on the reference disk is used as a reference pattern to facilitate the self-writing of servo data (also called "self-servo writing") to all disk surfaces. The self-servo writing process may be performed in accordance with a self-servo writing program that is executed by the hard disk drive controller and its associated components. Examples of this type of process are provided in U.S. Pat. No. 5,012,363, U.S. Pat. No. 6,519,107, U.S. Pat. No. 6,600,620, U.S. Pat. No. 6,631,046, and U.S. Pat. No. 6,714,376. In another alternative, a reference pattern is imprinted on a master disk surface by means of magnetic printing before assembly. After assembly, the reference pattern is used to provide position information in a self-servo writing process that writes servo data to all disk surfaces. Examples of this type of process are provided in U.S. Pat. No. 6,304,407. U.S. Pat. No. 6,704,156 and U.S. Pat. No. 6,738,205. In a third alternative, a pure or self-propagating self-servo writing process is performed in a hard disk drive that is assembled from blank disks containing no reference patterns. Initially a reference pattern is self-written to one of the disk surfaces using, for example, an inner or outer crash stop as an initial point of reference. Subsequently the reference pattern is used to provide position information in a self-servo writing process that writes servo data to all disk surfaces. Examples of this type of process are provided in U.S. Pat. No. 5,668,679, U.S. Pat. No. 6,771,443, U.S. Pat. No. 6,798,610, and U.S. Pat. No. 6,819,518.

SUMMARY

Embodiments of the invention provide compensation for disk mode disturbances during self-writing of servo data in a manner that accounts for differences in orientation between the disk surface from which position information is derived and the disk surface on which servo data is written.

In accordance with one embodiment, a servo control process in a hard disk drive includes deriving transducer head position information from a signal supplied by a first transducer head associated with a first disk surface having a first orientation. The position of the first transducer head and a second transducer head writing servo data to a second disk surface having a second orientation opposite the first orientation are controlled using the transducer head position information. A disk mode disturbance detected in the transducer head position information is compensated by moving the first transducer head and the second transducer head in opposite directions with respect to their corresponding disk surfaces.

In accordance with another embodiment, a hard disk drive comprises one or more disks each having respective surfaces having opposite orientations, a motor for rotating the disks, an actuator arm assembly supporting a respective transducer head corresponding to each disk surface, a primary actuator for moving the actuator arm assembly with respect to the disk surfaces, a respective microactuator corresponding to each transducer head for moving the corresponding transducer head, and a servo controller for supplying a primary actuator control signal to the primary actuator and a microactuator control signal to the microactuators. Microactuators corresponding to disk surfaces having a first orientation have a first wiring polarity and microactuators corresponding to disk surfaces having a second orientation opposite the first orientation have a second wiring polarity opposite the first wiring polarity.

In accordance with another embodiment, a self-servo writing process in a hard disk drive comprises deriving transducer head position information from a signal supplied by a first transducer head associated with a first disk surface, controlling the position of the first transducer head and a second transducer head writing servo data to a second disk surface using the transducer head position information, and compensating a disk mode disturbance detected in the transducer head position information by applying control signals to microactuators associated with the first transducer head and the second transducer head. Where the microactuators have wiring polarities that correspond to the orientations of their corresponding disk surfaces, the same control signal may be provided to all microactuators, and the polarity of the control signal may be determined in accordance with the wiring polarity of the microactuator corresponding to the transducer head that supplies the signal from which position information is derived. Where the microactuators all have the same wiring polarity, control signals of opposite polarity may be supplied where the reading transducer head and the writing transducer head correspond to disk surfaces having opposite orientations.

DETAILED DESCRIPTION

In the typical case of normal hard disk drive operation, a transducer head reads user data from or writes user data to a track on a disk surface and concurrently reads servo data from the same disk surface to supply the servo controller with data and signals enabling the performance of the track following operation. The track following operation is essentially a feedback controlled operation that causes the transducer to follow the track based on information obtained from the track itself.

In contrast to the normal operation case, self-servo writing presents a special case of servo control that may involve the writing of servo data to one disk surface while position information is derived from servo data or a reference pattern read from a different disk surface. The inventors have recognized that certain cases of self-servo writing benefit from the use of servo control methods that are different from the servo control methods that would be employed during normal operation. In particular, in self-servo writing cases where position information is derived from one disk surface while servo data is written to another disk surface having the opposite orientation, disk mode disturbances are preferably compensated at the servo writing surface in a manner that is opposite to the compensation that is applied at the surface from which position information is derived.

Disk mode disturbances, also referred to as disk flutter, are out-of-plane vibrations of the disk that occur at characteristic modes in a range that depends on factors such as the diameter of the disk, its thickness and its materials. The disks used in hard disk drives having a three and one-half inch form factor are known to have disk modes in the range of 500 Hz to 2000 Hz. Disk mode disturbances are caused by a number of factors including irregularities in the physical disk structure. Various problems associated with out-of-plane disk motion are discussed in U.S. Pat. No. 6,088,192.

Figure 4A:
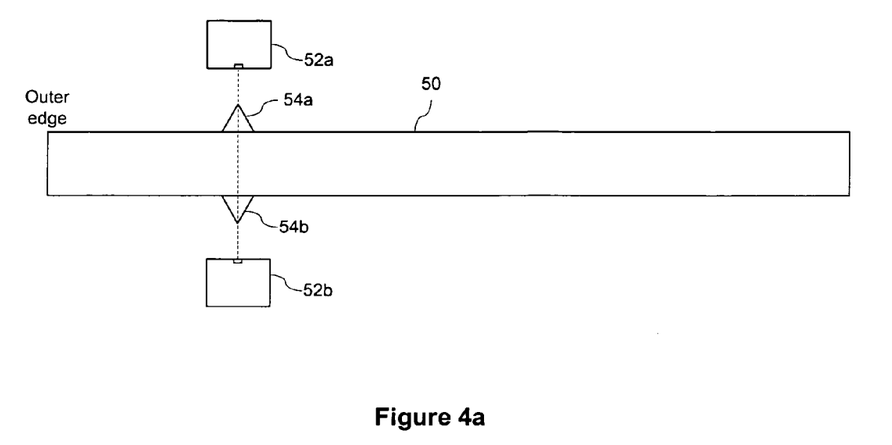
FIGS. 4a and 4b illustrate the instantaneous effect of a disk mode disturbance on alignment between transducer heads and tracks on a disk surface.
Figure 4B:
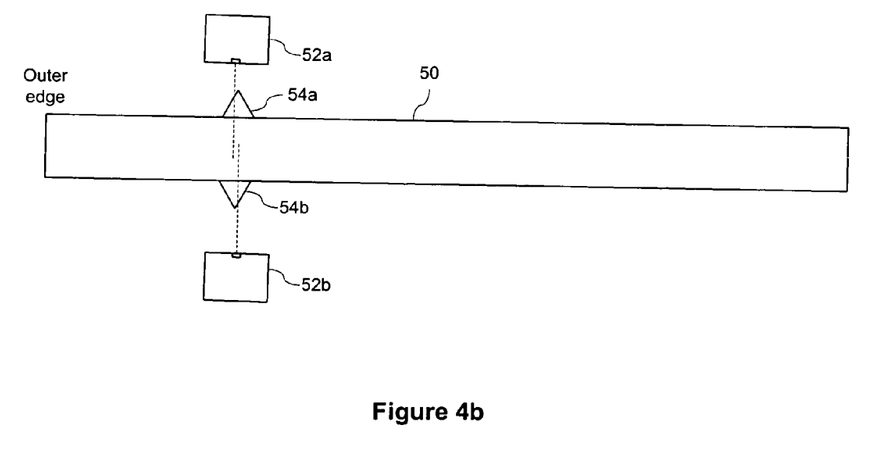

FIGS. 4a and 4b illustrate the effect of disk mode disturbance on the positions of transducer heads relative to the disk surfaces. Dimensions and distances are exaggerated in these drawings to more readily illustrate the points discussed in connection therewith. FIG. 4a shows a hard disk device in the absence of disk mode disturbance, while FIG. 4b shows an instantaneous view of a hard disk device during a disk mode disturbance. As seen in FIG. 4a, in the absence of disk mode disturbance, the surfaces of the disk 50 are approximately equidistant from their corresponding transducer heads 52a, 52b, and the transducer heads 52a, 52b are aligned with the centers of tracks 54a, 54b on the surface of the disk 50. FIG. 4b shows an instantaneous view of the disk at an instant during a disk mode disturbance. At this instant, the disk is angled slightly upward at its outer diameter. This has the effect of rotating the transducer heads 52a, 52b through the action of the air bearing that separates the disk surface from the transducer heads, and may also change the distances between the transducers 52a, 52b and the disk surfaces. The net effect of this movement is lateral displacement of the heads 52a, 52b relative to the centers of the tracks 54a, 54b. In particular, the point on the disk surface that is nearest the upper transducer head 52a is shifted slightly outward, as shown by the broken line drawn perpendicular to the disk surface and passing through the center of the upper transducer head 52a. Similarly, the point on the disk surface that is nearest the lower transducer head 52b is shifted slightly inward as shown by the broken line drawn perpendicular to the disk surface and passing through the center of the lower transducer head 52b. This causes both of the transducer heads 52a, 52b to be off center with respect to the tracks 54a, 54b. The periodic up and down motion of the disk during the disk mode disturbance effectively moves the track center lines back and forth with respect to the transducer heads in a periodic fashion. In a hard disk drive operating at 7200 r.p.m., a disk mode disturbance having a frequency of 1200 Hz will produce approximately 10 cycles of back and forth movement during a single disk revolution.

During normal operation, compensation for disk mode disturbances is provided by supplying signals to the microactuator of the active transducer to move the transducer in a manner that offsets the displacement of the track centerline. However, this compensation is detrimental in some cases during self-writing of servo data. Referring again to FIG. 4b, assume that self-servo writing is being performed, with position information being derived from servo data or a reference pattern on the upper surface of the disk 50 while servo data is written to the lower surface of the disk 50. At the instant illustrated in FIG. 4b, the servo control system will detect from the servo data of the track 54a that the upper transducer 52a is displaced to the outside of the track 54a. Under conventional control, the servo controller will supply a signal to the microactuators that causes the microactuators to move inward with respect to the disk so as to realign the transducer head 52a with the track 54a. However, in the self-servo writing case described above, such compensation amplifies the effect of the disturbance on the transducer head 52b that is writing servo data to the lower disk surface, resulting in the writing of servo data that significantly deviates from the ideal circular track shape. Since the displacement produced by the disk mode disturbance at the lower transducer head 52b is opposite in direction to the displacement produced at the upper surface, the appropriate compensation at the lower transducer head 52b is opposite in direction to the appropriate compensation at the upper transducer head 52a where the disturbance is actually detected.

Figure 5:
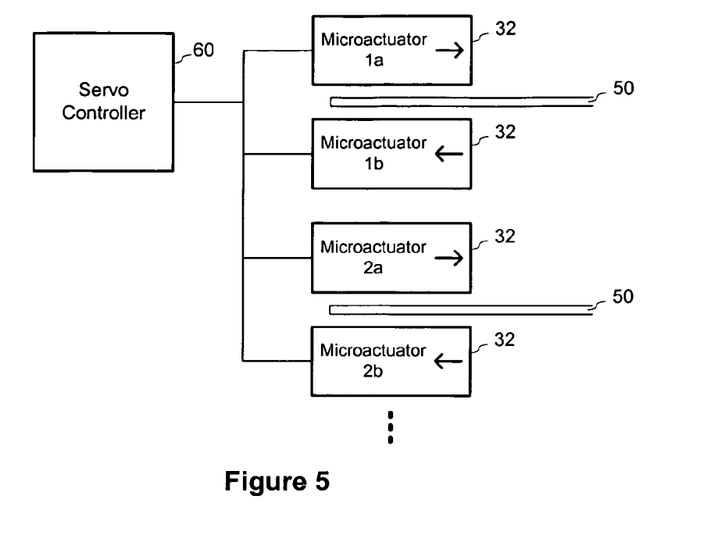
FIG. 5 illustrates features in accordance with a first embodiment of the invention.
Figure 6:
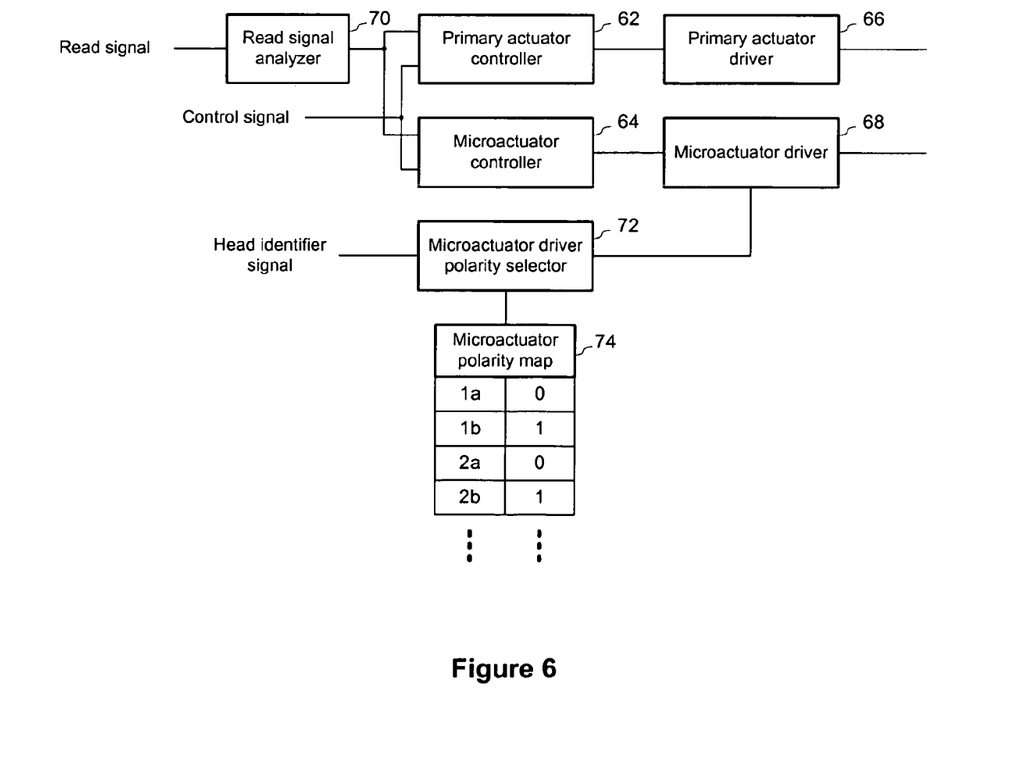
FIG. 6 illustrates details of the servo controller of FIG. 5.

FIGS. 5 and 6 show features of one embodiment of the invention. As shown in FIG. 5, the embodiment includes a servo controller 60 that supplies the same control signal to microactuators 32 associated with transducer heads. In FIG. 5, the arrow associated with each microactuator indicates its wiring polarity relative to the other microactuators. In contrast to the conventional implementation shown in FIG. 3, the embodiment of FIG. 5 employs microactuators that are wired such that the microactuators associated with upper surfaces of the disks 50 have a wiring polarity that is opposite to that of the microactuators associated with lower surfaces of the disks 50. Consequently, a given signal supplied to the microactuators will cause the upper and lower microactuators to move in opposite directions. Thus, for a disk mode disturbance detected from position information derived at any given surface, the resulting control signal supplied to the microactuators causes movement of microactuators in a first manner at all surfaces having the same orientation as the surface at which the disturbance is detected, and in an opposite manner at all surfaces having the opposite orientation.

FIG. 6 illustrates details of a servo controller that may be used in the embodiment of FIG. 5. Control functions within the servo controller are divided between a primary actuator controller 62 and a microactuator controller 64. The primary actuator controller 62 provides a control signal to a primary actuator driver 66 that produces a voltage or current waveform for driving the primary actuator. Likewise, the microactuator controller 64 provides a control signal to a microactuator driver 68 that produces a voltage or current waveform for driving the microactuators in accordance with the control signal. The microactuator controller 64 is implemented to detect and provide compensation for disturbances in a characteristic disk mode disturbance frequency range, for example, 500 HZ to 2000 Hz, while the primary actuator controller 62 is implemented to provide compensation for lower frequency disturbances. The controllers 62, 64 also provide conventional control functions for controlling the positions of the transducer heads during various operations such as seeking, settling and track following. In the illustrated embodiment, the primary actuator controller 62 and microactuator controller 64 are implemented using a parallel loop architecture, however other architectures such as a master-slave loop, dual feedback loop, and a master-slave with decoupling architecture may also be implemented.

The servo controller further includes a read signal analyzer 70. The read signal analyzer 70 receives an analog signal generated by a read element of a transducer head based on servo burst data or reference pattern data recorded on a disk surface and produces a position error signal from the read signal. An example of a read signal analyzer 70 that generates a position error signal from servo burst data is provided in U.S. Pat. No. 6,760,185. The primary actuator controller 62 and microactuator controller 64 receive the position error signal and perform control operations based on an estimate of transducer position derived from the position error signal. The primary actuator controller 62 and microactuator controller 64 also receive a control signal from the disk drive controller indicating the operation to be performed.

The servo controller further includes a microactuator driver polarity selector 72 and a microactuator polarity map 74. The polarity map 74 stores data representing the wiring polarity of each microactuator. The polarity selector 72 receives a head identifier signal from the hard disk controller that identifies the transducer head that is supplying the read signal. Based on the head identifier and the data stored in the microactuator polarity map 74, logic circuitry within the polarity selector 72 provides a polarity control signal to the microactuator driver 68. The polarity control signal controls the polarity state of the microactuator driver signal produced by the driver 68. For example, in implementations where the microactuator driver 68 includes an amplifier circuit for amplifying a waveform generated in response to the microactuator control signal, the polarity control signal may switch the amplifier between an inverting and a non-inverting state. Through this mechanism, the servo controller ensures that a microactuator driver signal of appropriate polarity is supplied to the microactuator for the transducer head that is supplying the read signal from which position information is derived, taking into account the wiring polarity of the microactuator. At the same time, microactuators for transducers at disk surfaces having an orientation opposite to that of the surface from which the read signal is generated will move in an opposite direction due to their opposite wiring polarity. Thus appropriate compensation for disk mode disturbances is provided at all surfaces in both normal operation and self-servo writing cases.

Figure 7:
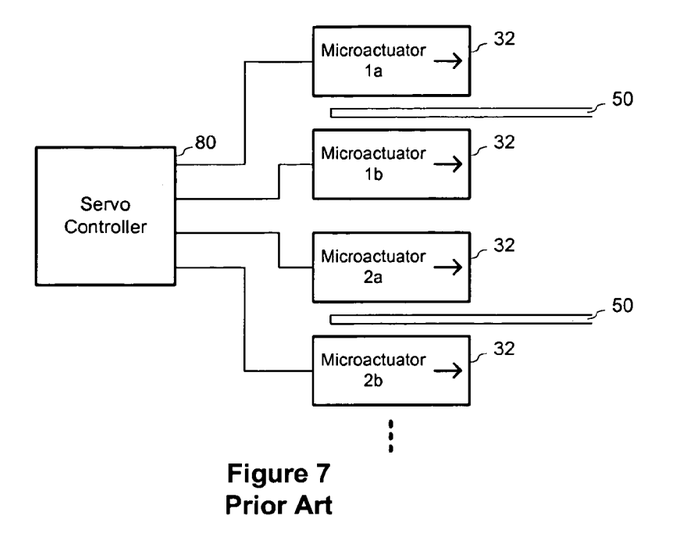
FIG. 7 illustrates features in accordance with a second embodiment of the invention.
Figure 8:
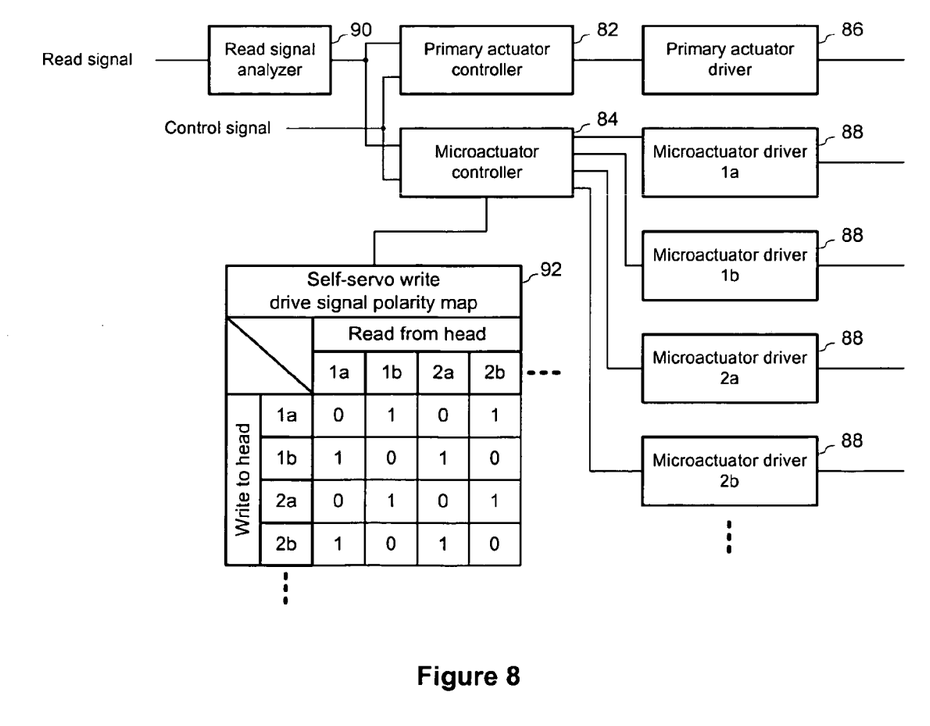
FIG. 8 illustrates details of the servo controller of FIG. 7.

FIGS. 7 and 8 show features of a second embodiment. As shown in FIG. 7, the embodiment includes a servo controller 80 that supplies separate control signals individually to microactuators 32 associated with transducer heads. This configuration allows each microactuator 32 to be controlled individually. Individually controlled microactuators are known and utilized in hard disk drives such as those described in U.S. Pat. No. 6,493,176 and U.S. Pat. No. 6,798,610.

FIG. 8 illustrates details of a servo controller that may be used in the embodiment of FIG. 7. Control functions within the servo controller are divided between a primary actuator controller 82 and a microactuator controller 84. The primary actuator controller 82 provides a control signal to a primary actuator driver 86 that produces a voltage or current waveform for driving the primary actuator. The microactuator controller 84 provides individual control signals to respective microactuator drivers 88 that produce voltage or current waveforms for driving the microactuators in response to the control signal. The microactuator controller 84 is implemented to detect and provide compensation for disturbances in a characteristic disk mode disturbance frequency range, for example, 500 HZ to 2000 Hz, while the primary actuator controller 82 is implemented to provide compensation for lower frequency disturbances. The controllers 82, 84 also provide conventional control functions for controlling the positions of the transducer heads during various operations such as seeking, settling and track following. In the illustrated embodiment, the primary actuator controller 82 and microactuator controller 84 are implemented using a parallel loop architecture, however other architectures such as a master-slave loop, dual feedback loop, and a master-slave with decoupling architecture may also be implemented.

The read signal analyzer 90 receives an analog signal generated by a read element of a transducer head based on servo burst data or reference pattern data recorded on a disk and produces a position error signal from the read signal. The primary actuator controller 62 and microactuator controller 64 receive the position error signal and perform control operations based on an estimate of transducer position derived from the position error signal. The primary actuator controller 82 and microactuator controller 84 also receive a control signal from the disk drive controller indicating the operation to be performed.

The servo controller further includes a self-servo write drive signal polarity map 92 that may be read by the microactuator controller 84. The polarity map 92 stores data indicating whether signals of opposite polarity are to be supplied to the microactuators of the reading and writing transducers during a self-servo writing process. For purposes of this document, signals are considered to be of opposite polarity when they produce motion of microactuators having the same wiring polarity in opposite directions. In the polarity map of FIG. 8, a 1 indicates that a polarity difference is required. The data in the polarity map of FIG. 8 assumes that all microactuators have the same wiring polarity, as indicated by the arrows associated with the microactuators in FIG. 7. Using the information represented in the polarity map 92, control logic within the microactuator controller 84 controls the polarities of drive signals produced by the microactuator drivers 88 during self-servo writing operations in accordance with the orientations of the disk surfaces to which servo data is written and from which servo or reference data used for a tracking operation is read, such that appropriate compensation for disk mode disturbances is provided at the reading and writing disk surfaces.

The microactuator control of the embodiments described herein may be employed in all varieties of self-servo writing, including but not limited to self-servo writing processes that utilize master servo data or reference patterns produced by a servo track writer, self-servo writing processes that utilize reference patterns formed by magnetic printing, and pure or self-propagating self-servo writing processes that self-write a reference pattern that is then used to provide positional information in a self-servo writing process. Accordingly, the signals used by the servo controller to position the transducer heads during self-servo writing may be derived from servo data or from a reference pattern provided on one of the disk surfaces. The generation of a position error signal by a read signal analyzer from servo data or reference pattern data may be implemented in accordance with the particular type of servo data or reference pattern data, such as in the devices described in the various patents cited herein. Generally the same primary actuator and microactuator control loop implementation may be utilized to provide position control based on a position error signal derived from either servo data or a magnetically printed or self-written reference pattern.

The microactuator control of the embodiments described herein may be employed in all manner of hard disk drive devices, including those having a conventional three and one-half inch form factor and those having larger or smaller dimensions. In each case the characteristic frequency range to be detected and compensated by the microactuator controller may be selected in accordance with a known or measured disk mode frequency range of the particular device or device type.

A variety of writing modes may be employed. In one alternative, servo data may be written in a bank writing mode, in which servo data is written to multiple disk surfaces or all disk surfaces concurrently. This mode may be preferable in applications where it is desired to perform self-servo writing quickly. In another alternative, servo data may be written in a staggered writing mode, in which servo data is written to disk surfaces one at a time based on servo data or a reference pattern provided on one of the disk surfaces. This mode may be preferred to avoid problems resulting from skew between the positions of the respective first stages of the actuator arm assembly.

The aforementioned alternatives provide servo data or a reference pattern on one disk surface and write servo data to the surfaces of other disks based on that reference pattern. When compensating for disk mode disturbances, these alternatives assume that the disk mode disturbance experienced at the disk providing the reference pattern is also experienced at the disk where servo data is written, even if that is a different disk. In a third alternative, greater precision in disk mode compensation may be achieved by providing servo data or a reference pattern on one surface of each disk, such as by servo track writing, magnetic printing or self-writing. Self-writing of servo data to both surfaces of each disk is then performed using position information derived from the servo data or reference pattern of that disk itself. This alternative may be more time consuming than the aforementioned bank write and staggered write modes, however the disk mode compensation provided during self-servo writing in this alternative will be directly responsive to a disturbance detected at that disk rather than at another disk in the hard disk drive assembly, thus providing greater accuracy in the self-servo writing process.

In yet another alternative, servo data may be written to both sides of a disk in a back and forth process in which one or several tracks of servo data are written to a first side of the disk while position data is read from the opposite side of the disk, and one of the newly written servo tracks is then used to provide position data while further servo tracks are written to the opposite side of the disk. In this manner servo tracks are written to both sides of the disk in an iterative fashion. An example of this type of servo track writing is provided in U.S. Pat. No. 6,798,610.

The circuits, devices, features and processes described herein are not exclusive of other circuits, devices, features and processes, and variations and additions may be implemented in accordance with the particular objectives to be achieved. For example, circuits as described herein may be integrated with other circuits not described herein to provide further combinations of features, to operate concurrently within the same devices, or to serve other purposes. Thus it should be understood that the embodiments illustrated in the figures and described above are offered by way of example only. The invention is not limited to a particular embodiment, but extends to various modifications, combinations, and permutations that fall within the scope of the claims and their equivalents.

What is claimed is:

1. A servo control process in a hard disk drive comprising:
   deriving transducer head position information from a signal supplied by a first transducer head associated with a first disk surface having a first surface orientation;
   controlling the position of the first transducer head and a second transducer head writing servo data to a second disk surface having a second surface orientation opposite the first surface orientation using the transducer head position information; and
   compensating a disk mode disturbance detected in the transducer head position information by moving the first transducer head and the second transducer head in opposite directions with respect to their corresponding disk surfaces.

2. The servo control process claimed in claim 1, wherein compensating a disk mode disturbance comprises supplying a control signal to a first microactuator controlling the position of the first transducer head and to a second microactuator controlling the position of the second transducer head, wherein the first microactuator and the second microactuator have opposite wiring polarities.

3. The servo control process claimed in claim 2, wherein compensating said disk mode disturbance further comprises:
   detecting which transducer head among a plurality of transducer heads of the hard disk drive is said first transducer head supplying said signal; and
   setting a polarity state of the control signal supplied to microactuators associated with said plurality of transducer heads in accordance with the wiring polarity of the microactuator associated with the first transducer head.

4. The servo control process claimed in claim 1, wherein compensating a disk mode disturbance comprises supplying a first control signal to a first microactuator controlling the position of the first transducer head and supplying a second control signal to a second microactuator controlling the position of the second transducer head, wherein the second control signal is opposite in polarity to the first control signal.

5. The servo control process claimed in claim 1, wherein the signal supplied by the first transducer head is generated based on servo data read from the first disk surface.

6. The servo control process claimed in claim 1, wherein the signal supplied by the first transducer head is generated based on a reference pattern read from the first disk surface.

7. The servo control process claimed in claim 6, wherein the reference pattern is a magnetically printed reference pattern.

8. The servo control process claimed in claim 6, wherein the reference pattern is a self-written reference pattern.

9. The servo control process claimed in claim 1, wherein said first disk surface and said second disk surface are opposite surfaces of the same disk.

10. The servo control process claimed in claim 1, wherein said first disk surface and said second disk surface are surfaces of different disks.

11. A hard disk drive comprising:
    one or more disks, each disk having respective surfaces having opposite orientations;
    a motor for rotating the disks;
    an actuator arm assembly supporting a respective transducer head corresponding to each disk surface;
    a primary actuator for moving the actuator arm assembly with respect to the disk surfaces;
    a respective microactuator corresponding to each transducer head for moving the corresponding transducer head, wherein microactuators corresponding to disk surfaces having a first orientation have a first wiring polarity and microactuators corresponding to disk surfaces having a second orientation opposite the first orientation have a second wiring polarity opposite the first wiring polarity; and
    a servo controller for supplying a primary actuator control signal to the primary actuator and a microactuator control signal to the microactuators.

12. The hard disk drive claimed in claim 11, wherein the servo controller comprises a microactuator controller configured to compensate a disk mode disturbance detected in a signal read from a disk surface by a transducer head.

13. The hard disk drive claimed in claim 12, wherein the servo controller further comprises a microactuator driver polarity selector for controlling the polarity of the microactuator control signal in accordance with the wiring polarity of the microactuator associated with the disk surface from which the signal is read.

14. The hard disk drive claimed in claim 13, wherein the servo controller further comprises a polarity map representing the wiring polarities of the respective microactuators, and wherein the microactuator driver polarity selector controls the polarity of the microactuator control signal in accordance with said wiring polarities represented in said polarity map.

15. A self-servo writing process in a hard disk drive comprising:

deriving transducer head position information from a signal supplied by a first transducer head associated with a first disk surface;

controlling the position of the first transducer head and a second transducer head writing servo data to a second disk surface using the transducer head position information; and compensating a disk mode disturbance detected in the transducer head position information by applying control signals to microactuators associated with the first transducer head and the second transducer head.

16. The self-servo writing process claimed in claim 15, wherein microactuators corresponding to disk surfaces having a first orientation have a first wiring polarity, and microactuators corresponding to disk surfaces having a second orientation have a second wiring polarity opposite said first wiring polarity, wherein said compensating comprises providing the same control signal to the microactuators corresponding to the first transducer head and the second transducer head, and wherein a polarity of said control signal is set in accordance with the wiring polarity of the microactuator associated with the first transducer head.

17. The self-servo writing process claimed in claim 15, wherein all microactuators corresponding to all disk surfaces have the same wiring polarity, wherein a first control signal is provided to a microactuator associated with the first transducer head, wherein, if the second transducer head corresponds to a disk surface having the same orientation as a disk surface corresponding to the first transducer head, the first control signal is provided to a microactuator associated with the second transducer head, and wherein, if said second transducer head corresponds to a disk surface having an orientation that is opposite to the orientation of the disk surface corresponding to the first transducer, a second control signal having a polarity opposite the polarity of the first control signal is provided to the microactuator associated with the second transducer head.

18. The self-servo writing process claimed in claim 15, wherein the signal supplied by the first transducer head is generated by reading servo data from the first disk surface.

19. The self-servo writing process claimed in claim 15, wherein the signal supplied by the first transducer head is generated by reading a reference pattern from the first disk surface.

20. The self-servo writing process claimed in claim 15, wherein the transducer head position information comprises a position error signal.

\* \* \* \* \*